Feb. 7, 1956     O. DOWIDAT     2,733,624
CLAMPING TONGS
Filed March 9, 1954     2 Sheets-Sheet 1
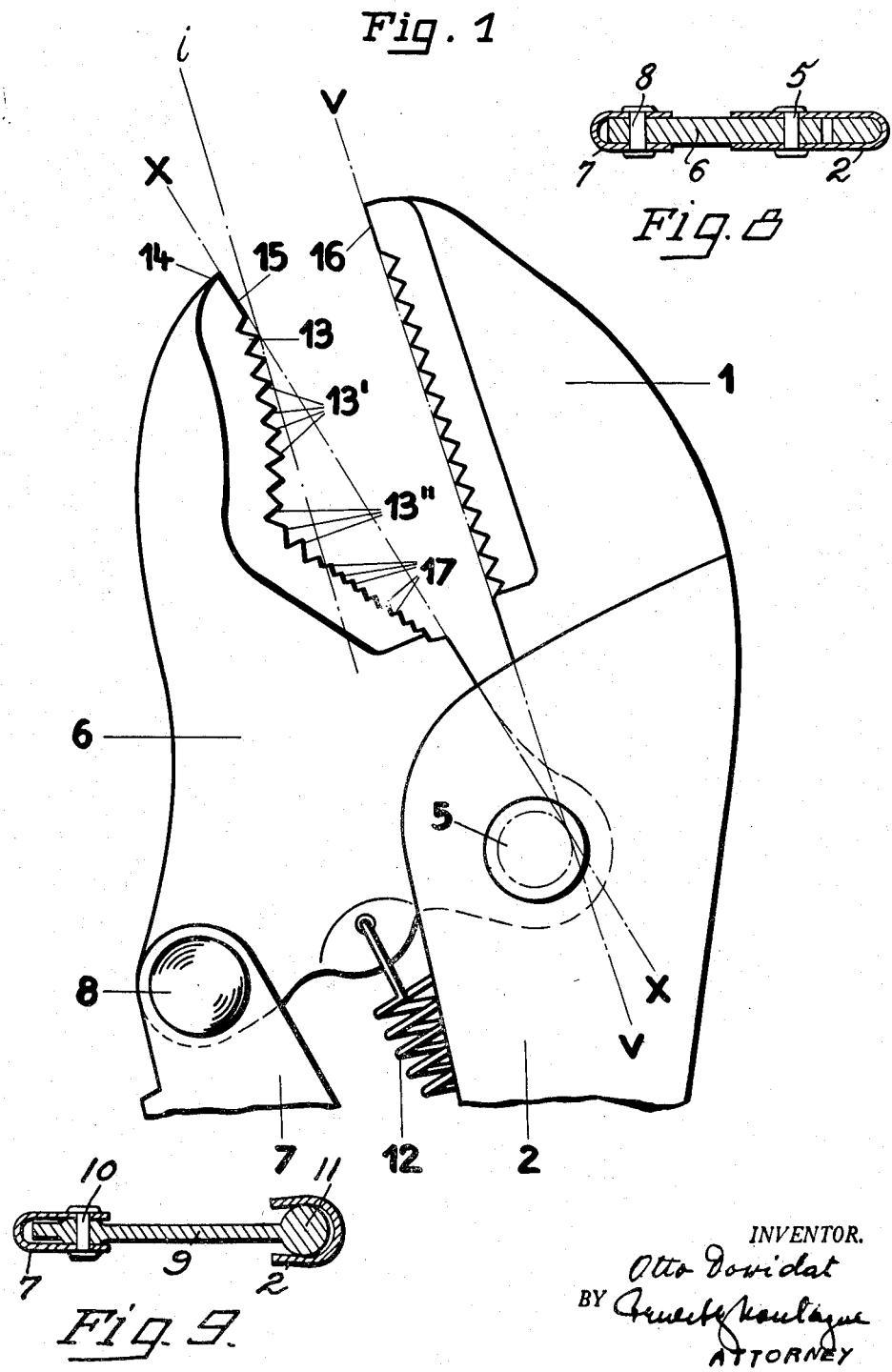
INVENTOR.
Otto Dowidat Feb. 7, 1956   O. DOWIDAT   2,733,624
CLAMPING TONGS
Filed March 9, 1954   2 Sheets-Sheet 2

INVENTOR.
Otto Dowidat
BY
ATTORNEY ns Patent Office
2,733,624
Patented Feb. 7, 1956

2,733,624

CLAMPING TONGS

Otto Dowidat, Remscheid-Luttringhausen, Germany, assignor to Firma Gedore Werkzeugfabrik Otto Dowidat, Remscheid-Luttringhausen, Germany, a corporation of Germany Application March 9, 1954, Serial No. 415,095

Claims priority, application Germany April 2, 1953

2 Claims. (Cl. 81—84)

The present invention relates to wrench-type pliers having relatively movable handles and a beyond dead center locking unit connected diagonally between said handles.

Such wrench-type pliers are known, in which the two jaws, which are equipped with crosswise disposed teeth, have straight gripping faces. It has been further proposed to provide flat, unteethed clamping faces at the mouth end of the jaws.

It has been also proposed before to provide one jaw with a straight gripping face and the other jaw with a first convex shaped face which is followed by a concave, hollow and bow-shaped gripping face.

Both structures have the inherent drawback that flat workpieces, which are clamped in the mouth of the pliers, may swing in the mouth plane. The same disadvantage has been found to an even greater extent in connection with round workpieces, which are clamped longitudinally in the mouth of the jaws. Due to this drawback the workpiece often slides from the jaws sideways during working thereof, for instance, boring, polishing, or the like, leading to work stoppage, however, often to damage of the work piece or even also to accidents.

It is, therefore, one object of the present invention to provide wrench-type pliers which are capable of gripping safely straight as well as round workpieces without permitting a sideward swinging thereof and particularly when the workpiece is clamped longitudinally in the mouth of the jaws.

It is another object of the present invention to provide wrench-type pliers in which one jaw movable upon a pin relative to an immovable jaw has a convex and following hollow, concave and bow-shaped clamping face to terminate into a straight face which rises toward the joint of the jaws and which supports the workpiece in its clamped position, so that an imaginary plane disposed parallel to the plane of the gripping surface of said immovable jaw intersects said flat rising portion of the inner face of said movable jaw, to operate as abutment means for the rear end of the workpiece.

One of the effects brought about by this arrangement is the additional securing grip on the rear end of the workpiece. This is of particular advantage in connection with workpieces having sensitive for instance elastic surfaces. This additional securing grip permits of reduced clamping pressure and prevents damage of the faces of the workpieces, subjected to clamping pressure, marking and scratches thereon. The clamped workpiece, the rear end of which abuts the straight face of the movable jaw, is, thereby, pressed toward the immovable jaw and secured in its position. In this manner the workpiece is disposed in the mouth of the jaws in a way which forms a long lever arm preventing securely a sliding of the workpiece.

It is yet another object of the present invention to provide wrench-type pliers of a structure set forth above in which the said straight rear face of the movable jaw is equipped with step-like fine teeth. The steps provide a slight abutment for the workpiece upon insertion of the latter into the mouth of the jaws, which abutment assists in finding the best clamping position for the workpiece.

With these and other objects in view, which will become apparent in the following detailed description, the present invention will be clearly understood in connection with the accompanying drawings, in which:

Fig. 4 is a front elevation of the clamping tongs in a position clamping a plain-faced workpiece;

Fig. 8 is a section along the lines 8—8 of Fig. 2; and

Fig. 9 is a section along the lines 9—9 of Fig. 2.

Figure 1:
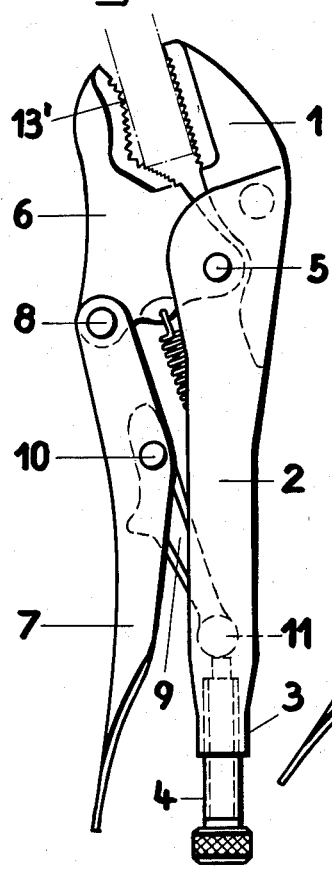
Figure 1 is a front elevation, at enlarged scale, of the jaw arrangement of clamping tongs in accordance with the present invention.
Figure 2:
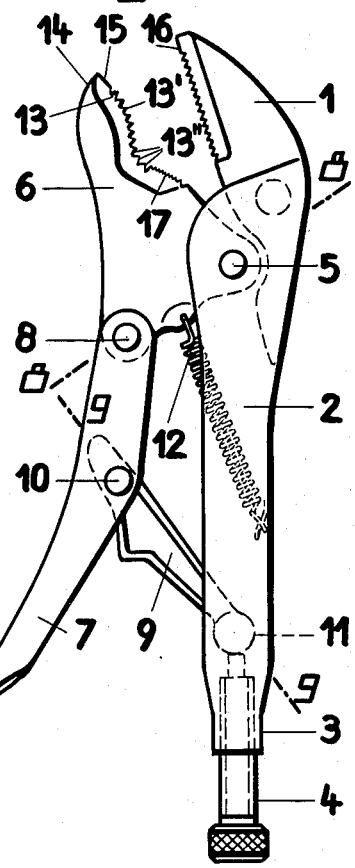
Fig. 2 is a front elevation of the clamping tongs in open position.
Figure 3:
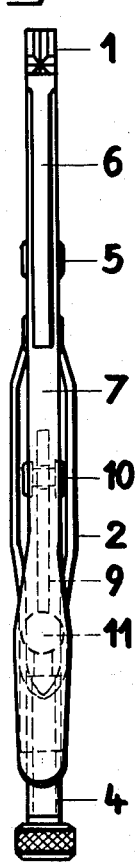
Fig. 3 is an end view thereof.

Referring now to the drawings, the clamping tongs comprise the leg 2 which is permanently secured to the fixed jaw 1, the rear end 3 of the leg 2 being formed as a socket which receives the supporting adjustment screw 4.

The movable jaw 6 is pivotally mounted on the pin 5 which is carried by the leg 2 of the fixed jaw 1. The two jaws 1 and 6 engage each other in the closed position of the mouth of the jaws in the joint along the planes x—x and v—v, respectively. A second leg-member 7 is pivotally mounted on the movable jaw 6 by means of the pin 8.

The leg 7 forms an angle shortly below its pivoting point and constitutes jointly with a lever 9 a knee-lever, one end of the lever 9 being pivotally secured to the leg 7 by means of the pivot 10 and its other end resting on the front face of the adjustment screw 4 by means of a supporting ball 11. The pivot points of the knee-lever are arranged in such manner that, upon pushing through the leg 7, a self-locking of the knee-lever is brought about.

A draw spring 12, the ends of which are secured to the movable jaw 6 and to the leg 2, respectively, is adapted to open the jaws upon overcoming the dead point, the opening of the jaws 1 and 6 being adjustable by adjusting the adjustment screw 4 in accordance with the particular requirements.

The inner faces of the jaws 1 and 6, respectively, carry teeth. The fixed jaw 1 has a plain face, while the movable jaw 6 has a bowed face.

The foremost tooth 13 of the bowed, movable jaw 6 is disposed at a predetermined distance from its front end 14, the latter being located on the line x—x, and the front portions of the inner faces of both jaws 1 and 6 being arranged without teeth.

The teeth 13' which are arranged in the bowed portion of the inner face of the jaw, which portion extends towards the fixed jaw 1, have comparatively wide pitch. A second bowed portion disposed in opposite direction is provided adjacent the first mentioned bowed portion, the second bowed portion carrying the teeth 13". The movable jaw 6 has finally a third plain portion disposed in a straight line, and rising toward the joint of the jaws along which fine step-like teeth 17 are provided, so that the inner face of the movable jaw forms a curve consisting of two bows and a plane portion. The third plain portion is arranged in such manner that an imaginary plane i (Fig. 1) disposed parallel to the plane of the gripping surface of the immovable jaw and engaging the inner face of said movable jaw intersects the flat rising portion of the inner face of the movable jaw, to operate as abutment means for the rear end of the workpiece. Due to such abutment a side movement of the workpiece, as experienced in known structures is prevented and a safe locking of the workpiece in the jaws is brought about.

As particularly clearly disclosed in Fig. 4, it is possible to clamp plain-faced workpieces, by inserting the workpieces as far as possible into the mouth formed by the jaws, such workpieces being supported by a clamping point on the teeth of the bowed portion of the jaw 6 in addition to their support of their lower edge of the third straight-faced portion which is preferably equipped with step-like teeth 17. The clamping of round workpieces, particularly of pipes, is brought about in the manner used in conventional pipe tongs. The pipe is in this case clamped crosswise at three points between the jaws 1 and 6 in the recess formed by the bowed teeth 13' and the teeth 17 of the straight portion of the inner face of the jaw 6.

Figure 5:
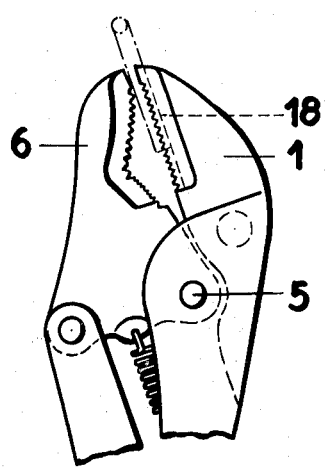
Fig. 5 is a fragmentary elevational view of the clamping tongs in a position clamping a round workpiece of small diameter.
Figure 7:
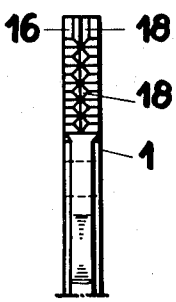
Fig. 7 is an elevation of the teethed face of the fixed jaw.

Round bolts, wires, or the like, may be gripped advantageously by longitudinal gripping (see Fig. 5). In order to make such longitudinal gripping possible, the plain, fixed jaw 1 is equipped with a median, longitudinal, prism-forming recess 18, as shown in Fig. 7. The workpiece to be clamped rests on one side in the recess 18 and pressed on the other side into the recess 18 by the jaw 6.

Figure 6:
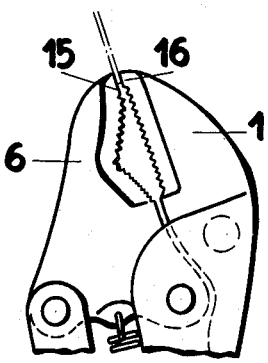
Fig. 6 is a fragmentary elevational view of the clamping tongs in a position clamping at short distance a blade-like workpiece.

The front portions 15 and 16 of the inner faces of the jaws 6 and 1, respectively, permit the clamping of thin, blade-like and short workpieces (Fig. 6), since the front faces 15 and 16 are disposed relative to the pivot pin 5 in substantially parallel arrangement, thereby securing a clamping of such workpieces.

While I have disclosed one embodiment of the present invention, it is to be understood that this embodiment is given by example only and not in a limiting sense, the scope of the present invention being determined by the objects and the claims.

I claim:

1. In wrench-type pliers including relatively movable jaws, each of said jaws being connected with a handle, and a beyond dead center locking unit connected diagonally between said handles, one of said jaws having pivot means and being immovable and the other of said jaws being movable relative to said immovable jaw, the inner face of said immovable jaw being flat and carrying crosswise disposed teeth, and the inner face of said movable jaw having a convex-shaped portion leading to a concave-shaped, hollow and bow-shaped portion and terminating into a flat portion rising toward the inner end of the face of said movable jaw, so that an imaginary plane disposed parallel to the plane of the gripping surface of said immovable jaw intersects said flat rising portion of the inner face of said movable jaw, to operate as abutment means for the rear end of a workpiece, said convex-shaped portion and said concave-shaped portion of said movable jaw carrying crosswise disposed teeth, and flat untoothed portions at the mouth end of both said jaws.

2. The wrench-type pliers, as set forth in claim 1, which includes step-like fine teeth on said flat, rising portion of the inner face of said movable jaw.

References Cited in the file of this patent

UNITED STATES PATENTS

| | | |
|---|---|---|
| 2,477,335 | Isele | July 26, 1949 |
| 2,664,774 | Harvie | Jan. 5, 1954 |
| 2,669,145 | Mead | Feb. 16, 1954 |